United States Patent
Kula et al.

(10) Patent No.: US 12,240,413 B2
(45) Date of Patent: Mar. 4, 2025

(54) PRETENSIONER TUBE FOR A BELT TENSIONER

(71) Applicants: ZF AUTOMOTIVE GERMANY GMBH, Alfdorf (DE); ZF AUTOMOTIVE SYSTEMS POLAND SP.ZO.O, Czestochowa (PL)

(72) Inventors: Michal Kula, Częstochowa (PL); Damian Suchanski, Grabowka (PL); Jacek Modrzynski, Tarnowskie Góry (PL); Blazej Kotas, Witkowice (PL); Dawid Migon, Wloszczowa (PL)

(73) Assignees: ZF AUTOMOTIVE GERMANY GMBH, Alfdorf (DE); ZF AUTOMOTIVE SYSTEMS POLAND SP.ZO.O, Czestochowska (PL)

( * ) Notice: Subject to any disclaimer, the term of this patent is extended or adjusted under 35 U.S.C. 154(b) by 358 days.

(21) Appl. No.: 17/779,581

(22) PCT Filed: Nov. 17, 2020

(86) PCT No.: PCT/EP2020/082395
§ 371 (c)(1),
(2) Date: May 25, 2022

(87) PCT Pub. No.: WO2021/104941
PCT Pub. Date: Jun. 3, 2021

(65) Prior Publication Data
US 2023/0001884 A1 Jan. 5, 2023

(30) Foreign Application Priority Data
Nov. 27, 2019 (DE) ..................... 10 2019 132 066.6

(51) Int. Cl.
*B60R 22/46* (2006.01)

(52) U.S. Cl.
CPC ...... *B60R 22/46* (2013.01); *B60R 2022/4647* (2013.01)

(58) Field of Classification Search
CPC ............ B60R 22/46; B60R 2022/4642; B60R 2022/4647
See application file for complete search history.

(56) References Cited

U.S. PATENT DOCUMENTS

| 9,744,940 B1 * | 8/2017 | Kohlndorfer ....... B60R 22/4628 |
| 2015/0336538 A1 * | 11/2015 | Gray .................. B60R 22/4628 242/389 |

(Continued)

FOREIGN PATENT DOCUMENTS

| DE | 102010051420 A1 | 5/2012 |
| DE | 102014006499 A1 | 11/2015 |
| DE | 102016118467 A1 | 3/2018 |

OTHER PUBLICATIONS

International PCT Search Report for corresponding International Application Serial No. PCT/EP2020/082395, mailed Dec. 18, 2020, pp. 1-4.

*Primary Examiner* — Sang K Kim
(74) *Attorney, Agent, or Firm* — Tarolli, Sundheim, Covell & Tummino LLP

(57) ABSTRACT

A tensioner tube (18) for guiding a load transmission element (20) for a belt tensioner comprises an exit end (32) and a tube section (34) adjacent to the exit end (32), the tube section (34) being configured and arranged so that the longitudinal axis (L) of the tube section (34) is substantially tangent to the drive gear (14), wherein an elongate projection (36) protruding into the interior of the tube, the longitudinal axis (I) of which is inclined in relation to the longitudinal axis (L) of the tube section (34), is formed in the tube section (34) adjacent to the exit end (32). A belt tensioner for a seat belt system comprises a pyrotechnically (Continued)

movable load transmission element (20) and a drive gear (14) which can be driven by the movable load transmission element (20). The load transmission element (20) is guided in a tensioner tube (18) of the above-mentioned type.

12 Claims, 2 Drawing Sheets

(56) References Cited

U.S. PATENT DOCUMENTS

| | | |
|---|---|---|
| 2018/0265034 A1 | 9/2018 | Kohlndorfer et al. |
| 2018/0265035 A1 | 9/2018 | Kohlndorfer et al. |
| 2018/0265036 A1 | 9/2018 | Kohlndorfer et al. |

* cited by examiner

PRETENSIONER TUBE FOR A BELT TENSIONER

RELATED APPLICATIONS

This application is a U.S. National Stage Application filed under 35 USC 371, claiming priority to Serial No. PCT/EP2020/082395, filed on 17 Nov. 2020; which claims priority from German Patent Application DE 10 2019 132 066.6, filed 27 Nov. 2019, the entireties of which are hereby incorporated herein by reference.

TECHNICAL FIELD

The invention relates to a tensioner tube for guiding a load transmission element for a belt tensioner. The invention further relates to a belt tensioner for a seat belt system comprising such tensioner tube.

BACKGROUND

A belt tensioner serves for reducing, in a case of restraint, impacts which may affect the restraint of the vehicle occupant, before the vehicle occupant starts to move forward movement and, where necessary, a load limiter starts to act. Said impacts include the so-called film reel effect (webbing that is loosely wound onto the belt reel) and the belt slack (webbing that is not tightly adjacent to the vehicle occupant). The belt tensioner reduces the belt slack and the film reel effect within a split second by tensioning the webbing. The vehicle occupant thus can take part in the vehicle deceleration at an early stage, and the conditions for the subsequent use of the load limiter are optimized.

From DE 10 2010 051 420 A1, a generic belt tensioner for a seat belt system is known comprising a drive unit and a load transmission element which, when the drive unit is activated, acts upon a rotatably supported drive gear that is coupled or can be coupled to the axle of a belt retractor. The load transmission element is guided in a tensioner tube wound in a space-saving manner and is made from a substantially deformable material so that the load transmission element is actuated in a damped manner at the drive gear and a high torque transmission is ensured. The tensioner tube is configured so that its end facing the drive gear is substantially tangent to the drive gear. In particular, in belt retractors of this type having been installed for quite a long time, the load transmission element which was straight before mounting may happen to fail, upon exiting, to adopt a straight shape again and to impact tangentially on the drive gear again because of its long dwell time within the curved tensioner tube, but will adopt a shape that is slightly curved toward the drive gear. In this way, the engaging area of the drive member may be located slightly closer in the direction of the drive axle than intended.

Moreover, from DE 10 2014 006 499 A1, a belt tensioner comprising an elongate tensioner tube is known in which a movable piston is pressurized and drives a load transmission element interacting with a drive gear. A stop against which the piston abuts in its stop position is provided at the exit end of the tensioner tube.

SUMMARY

It is the object of the invention to improve, in a generic belt tensioner, interaction between the load transmission element and the drive gear.

This object is achieved by a wound tensioner tube comprising the features of claim 1 and by a belt tensioner comprising the features of claim 8. Advantageous and useful configurations of the tensioner tube according to the invention and of the belt tensioner according to the invention are stated in the related subclaims.

The wound tensioner tube according to the invention for guiding a load transmission element has an elongate inwardly protruding projection in the tube section adjacent to the exit end the longitudinal axis of which is inclined against the longitudinal axis of the tube section.

Said elongate projection interacts, when the load transmission element exits, with the latter such that a curvature of the load transmission element caused by a long dwell time inside the curved tube is counteracted and a largely tangential introduction of the load transmission element into the drive gear is ensured. The clearance diameter of the tensioner tube in the area of the elongate projection is smaller than the outer diameter of the load transmission element so that, when the load transmission element exits, the projection digs into the latter and effectuates a largely positive guiding.

The inclination of the elongate projection based on the tangent to the drive gear advantageously ranges from 5° to 20° and particularly advantageously is about 15°.

The elongate projection can be favorably produced, in terms of manufacture, by impressing or embossing the outer surface of the tensioner tube.

Safe and low-loss guiding of the load transmission element is advantageously achieved when the elongate projection has a substantially V-shaped cross-section.

Low-loss guiding is advantageously achieved when only one single elongate projection is formed in the tensioner tube.

The guiding of the load transmission element and a compensation of the curvature upon exiting the tensioner tube is achieved with low loss in a particularly advantageous manner, when the elongate projection is formed laterally on the tube section such that it is provided in a central region between the side close to the drive gear and the side distant from the drive gear of the tube section.

DESCRIPTION OF THE DRAWINGS

Further features and advantages of the invention will be evident from the following description and from the attached drawings which are referred to, and wherein.

DESCRIPTION

Figure 1:
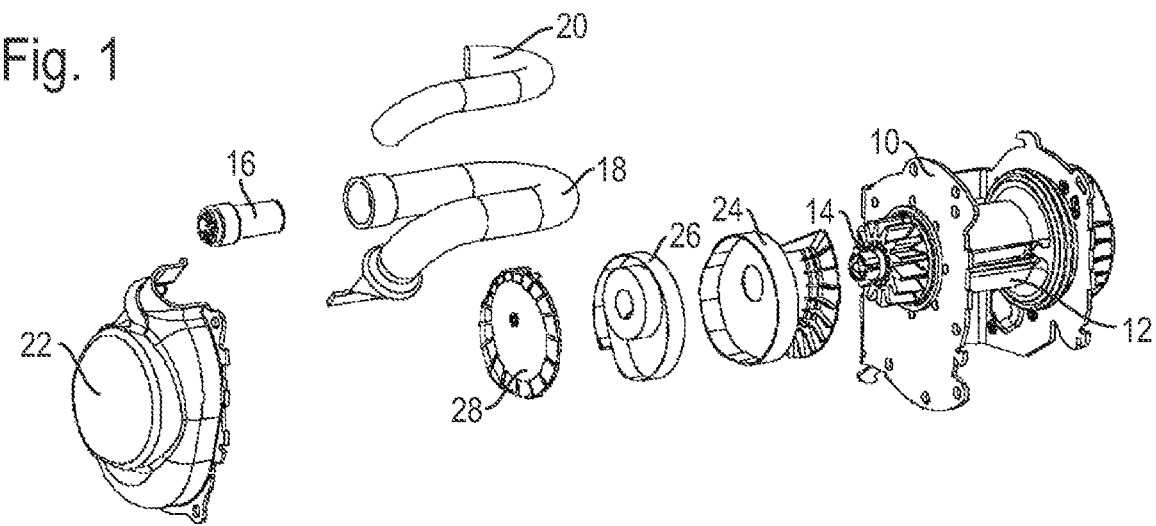
FIG. 1 shows an exploded view of a belt retractor comprising a belt tensioner according to the invention.
Figure 2:
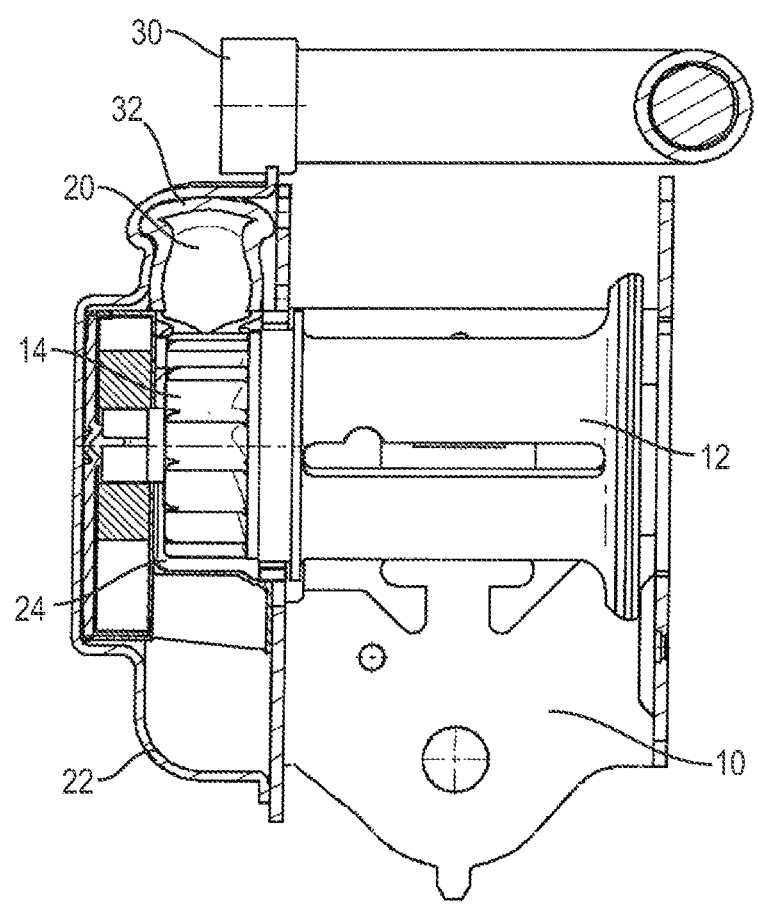
FIG. 2 shows a sectional view of the assembled belt retractor.

In FIG. 1, the substantial components of a belt retractor comprising a pyrotechnically driven belt tensioner are illustrated. FIG. 2 shows the belt retractor in the assembled state.

In a retractor frame 10, a belt reel 12 onto which webbing can be wound and from which webbing can be unwound is rotatably supported. A drive gear 14 having external teeth and, resp., having turbine blades which is coupled to the belt reel 12 is rotatably supported on the frame 10.

The belt tensioner of the belt retractor includes a pyrotechnical drive unit with an igniter 16 as well as a load transmission element 20 movably disposed in a tensioner tube 18. The components of the belt tensioner are accommodated at least partly in a tensioner case 22 that is mounted on the retractor frame 10.

Further, a stop disk 24, a coil spring 26 disposed therein and a cover 28 are attached to the drive gear 14. These components form a so-called spring side of the belt retractor which is not important to the function of the belt tensioner, however.

Figure 4:
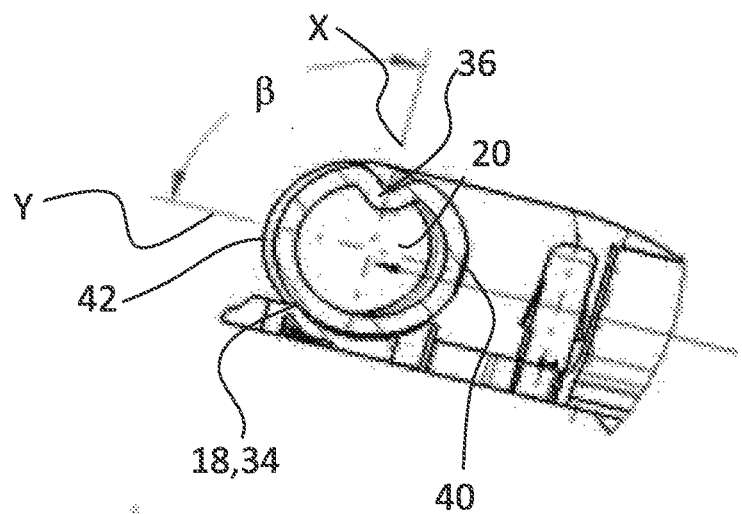
FIG. 4 shows a section across the tensioner tube according to the invention along the line IV-IV.
Figure 3:
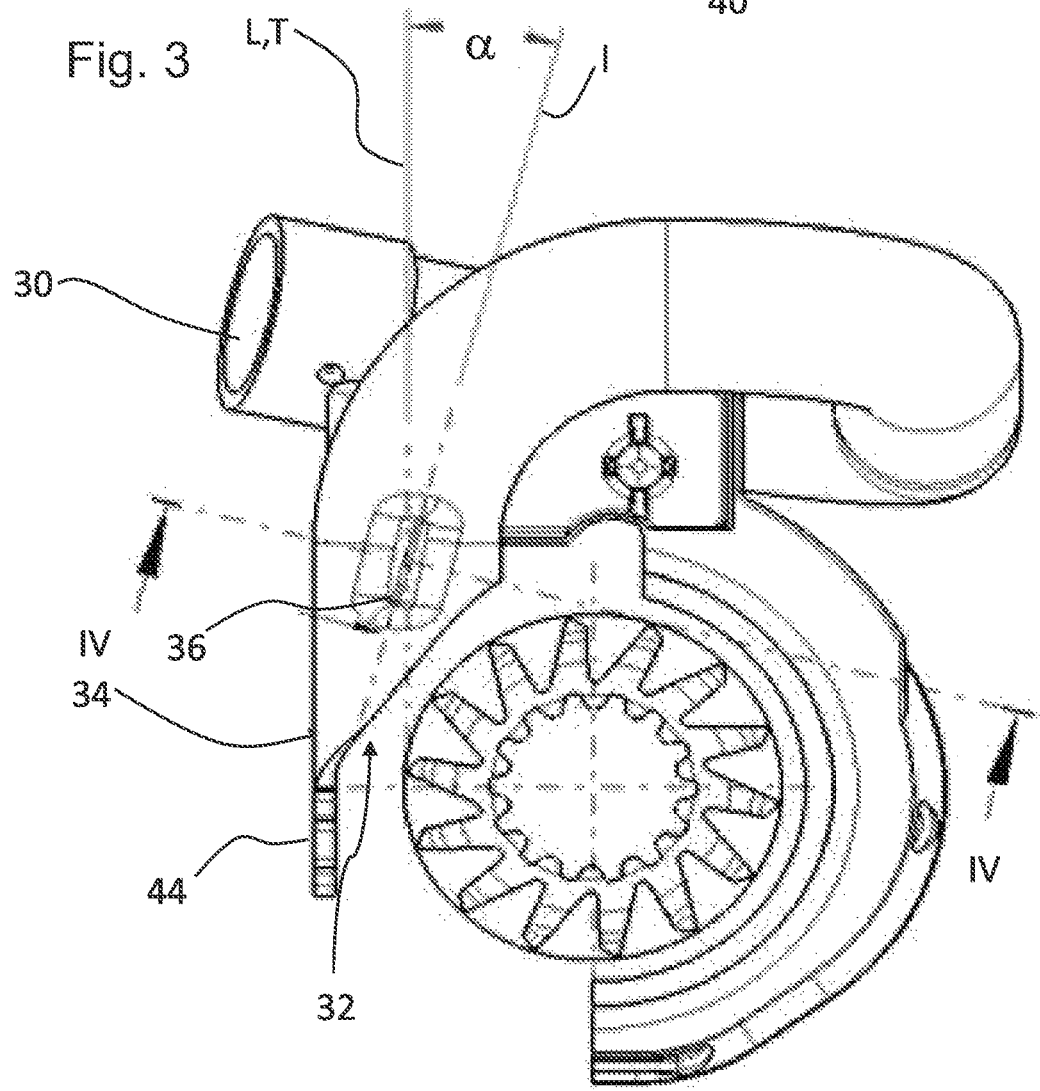
FIG. 3 shows a detail view of a tensioner tube according to the invention.

In the FIGS. 3 and 4, the tensioner tube 18 is illustrated in greater detail. The tensioner tube 18 has a first open end 30 that is tightly connected to the pyrotechnic drive unit. At the other tube end of the tensioner tube 18, the exit end 32 is formed which is disposed immediately adjacent to the drive gear 14, i.e., the exit end 32 is directed toward the drive gear 14. Accordingly, the outer part 44 distant from the drive gear of the tube section protrudes beyond the center of the drive gear.

The load transmission element 20 is movably disposed in the tensioner tube 18. A pressure chamber is formed in the tensioner tube between the pyrotechnic drive unit and the load transmission element 20. The outer diameter of the load transmission element 20 is slightly smaller than the inner diameter of the tensioner tube.

Between the first end 30 and the exit end 32 the tensioner tube is wound, with the tube section of the tensioner tube adjacent to the exit end being straight and extending tangentially to the drive gear. The longitudinal axis L of the tube section 34 forms a tangent T to the drive gear 14.

In the tube section 34, an elongate projection 36 is configured in the form of an impression directed to the interior of the tube. Said elongate projection 36 has a V-shaped cross-section. The longitudinal axis I of the elongate projection 36 is inclined outwardly in relation to the tangent T, viz. at an angle α of about 15°.

The elongate projection 36 is formed at the lateral surface of the tube section 34 facing away from the open end 30. Accordingly, the longitudinal axis L of the tube section 34 and the longitudinal axis I of the elongate projection 36 form a first plane X. A second plane Y is formed by the outer axis 40 close to the drive and the outer axis 42 distant from the drive of the tube section 34. The two planes X and Y enclose an angle β of 90°.

In the case of restraint, the pyrotechnic drive unit is activated and generates compressed gas which expands in the pressure chamber located between the drive unit and the load transmission element 20. Thus, the load transmission element 20 is pressurized inside the tensioner tube 18 so that the load transmission element 20 is moved away from the igniter 16. The load transmission element 20 exits the tensioner tube 18 through the exit end 32 and engages in the drive gear 14. Thus, the drive gear 14 is made to rotate. The drive gear 14 in turn makes the belt reel 12 coupled to the drive gear 14 to rotate in the winding direction of the webbing, and webbing is wound onto the belt reel 12.

When the load transmission element 20 exits the tensioner tube, it is guided by the elongate projection 36 in the direction of the outer part 44 distant from the drive so that the load transmission element is guided along the tube wall distant from the drive and a tangential run-in is ensured.

The invention claimed is:

1. A wound tensioner tube (18) for a belt tensioner to guide an elongate load transmission element (20) made from a substantially deformable material, comprising
    an exit end (32) provided for being directed to a drive gear (14) of the belt tensioner,
    and a tube section (34) adjacent to the exit end (32), the tube section (34) being configured and arranged so that the longitudinal axis (L) of the tube section (34) is substantially tangent to the drive gear (14),
    wherein
    in the tube section (34) adjacent to the exit end (32), an elongate projection (36) protruding into the interior of the tube is formed the longitudinal axis (I) of which is inclined in relation to the longitudinal axis (L) of the tube section (34).

2. The tensioner tube (18) according to claim 1, wherein the elongate projection (36) is arranged so that, based on the tangent (T) to the drive gear, its longitudinal axis (I) is outwardly inclined in relation to the curvature of the tensioner tube (18).

3. The tensioner tube according to claim 1, wherein the angle (α) between the longitudinal axis (L) of the tube section and the longitudinal axis (I) of the elongate projection ranges from 5° to 20°.

4. The tensioner tube according to claim 3, wherein the angle (α) is about 15°.

5. The tensioner tube according to claim 1, wherein the elongate projection (36) is formed by an embossing.

6. The tensioner tube according to claim 1, wherein the elongate projection (36) has a substantially V-shaped cross-section.

7. The tensioner tube according to claim 1, wherein a first plane (X) extends across the longitudinal axis (L) of the tube section and the longitudinal axis (I) of the elongate projection, that a second plane (Y) extends across the outer axle (40) close to the drive gear and the outer axle (42) distant from the drive gear of the tube section, and in that the first plane (X) and the second plane (Y) enclose an angle (β) of about 90°.

8. A belt tensioner for a seat belt system, comprising
    a pyrotechnically movable load transmission element (20) and a drive gear (14) which can be driven by the movable load transmission element (20),
    wherein
    the load transmission element (20) is guided in a tensioner tube (18) according to claim 1.

9. The tensioner tube according to claim 1, wherein the elongate projection extends longitudinally from adjacent the exit end away from the drive gear.

10. The tensioner tube according to claim 1, wherein the longitudinal axis of the elongate projection extends transverse to the tangent of the drive gear.

11. The tensioner tube according to claim 1, wherein the longitudinal axis of the elongate projection extends to a position radially outward of the drive gear.

12. The tensioner tube according to claim 11, wherein the longitudinal axis of the elongate projection does not intersect the drive gear.

* * * * *